C. F. SMITH & G. E. CURTISS.
TEA OR COFFEE POT.
APPLICATION FILED DEC. 31, 1908.
940,081.
Patented Nov. 16, 1909.
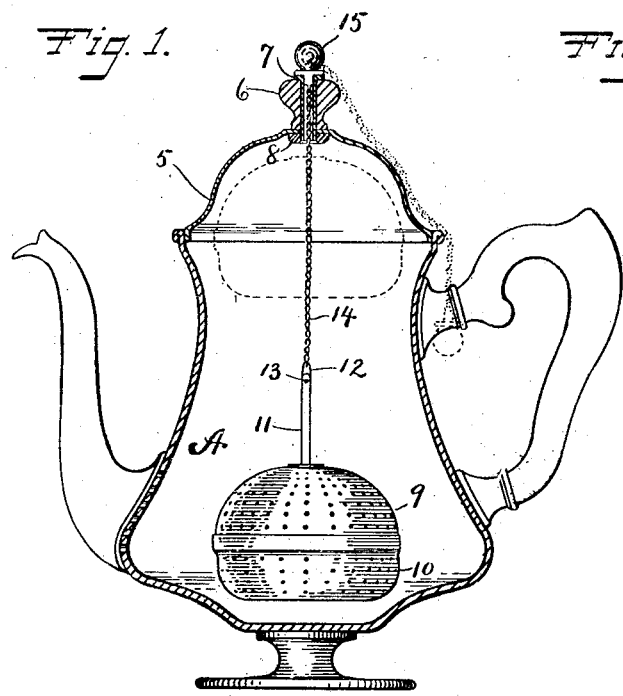
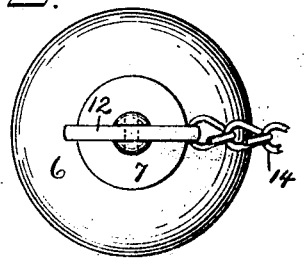
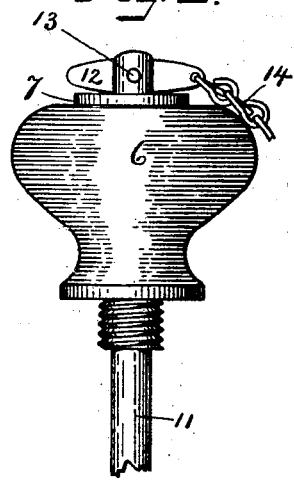

UNITED STATES PATENT OFFICE.

CHARLES F. SMITH AND GEORGE E. CURTISS, OF NEW BRITAIN, CONNECTICUT, ASSIGNORS TO LANDERS, FRARY AND CLARK, OF NEW BRITAIN, CONNECTICUT, A CORPORATION.

TEA OR COFFEE POT.

940,081. Specification of Letters Patent. Patented Nov. 16, 1909.

Application filed December 31, 1908. Serial No. 470,171.

*To all whom it may concern:*

Be it known that we, CHARLES F. SMITH and GEORGE E. CURTISS, both citizens of the United States, residing at New Britain, in the county of Hartford and State of Connecticut, have invented certain new and useful Improvements in Tea or Coffee Pots, of which the following is a specification.

Our invention relates to improvements in tea or coffee pots and the objects of our improvements are efficiency and convenience in construction, particularly with reference to withdrawing the tea or coffee from the liquid without removing the same from the pot.

In the accompanying drawing: Figure 1 is a central vertical section of our tea or coffee pot with certain parts in side elevation. Fig. 2 is an enlarged view of the hollow knob or handle of our tea pot cover together with the fastening devices and portion of the chain for elevating and supporting the tea ball. Fig. 3 is a side elevation of the same.

Similar reference characters refer to similar parts throughout the several views.

A, designates the body of our tea or coffee pot, and 5 the cover therefor. The said body may be of any ordinary construction. The cover is provided with a hollow knob or handle 6 which is preferably mounted on a headed tube 7 and held in place by a nut 8 screwed upon the lower end of the said tube.

The tea, coffee or other material for the infusion is confined in a cage or ball consisting of two cup-like parts 9 and 10, of a pervious structure detachably connected together. In the preferred form these parts are struck up from sheet metal perforated for the passage of liquid and detachably connected by shutting one into the other like a pail or box cover so that the material for infusion may be placed and held therein. The parts 9 and 10 taken together form what is known as a tea ball. To the center of the upper part of the tea ball we secure an upwardly extended rod 11, in the slotted upper end of which we pivotally secure a latch 12 by means of the pin 13. This rod is of a diameter that will readily pass longitudinally through the central hole in the knob or handle 6 and of a length that will permit the latch to pass completely through the knob when the rod is passed upwardly from below inside of the cover 5. The latch is of a width less than the inner diameter of the hollow knob and of a length in excess of the said diameter. A chain 14 is secured by one end to one end of the pivotal latch 12 and by its other end to a suitable enlargement or head 15, that is too large to pass through the hollow knob. The chain and its head should be secured to the latch and rod with the upper part of the tea ball arranged for being on the inner side of the pot cover 5, and the head of the chain on the outer side thereof. The tea ball may be loaded by removing the part 10 and replacing the same after loading. In order to infuse the material contained within the tea ball the body of the pot is supplied with hot water which may be heated as desired and the tea ball let down into the lower part of the pot and into the water as shown by the full lines in Fig. 1. It should be noted that in this position the latch stands in vertical alinement with the chain and rod. Whenever it is desired to remove the tea ball from the liquid it is only necessary to pull vertically on the chain until the latch passes upwardly wholly out of the hollow knob. Then pull the chain a little to one side to throw the latch 12 out of alinement with the rod 11 and then release the chain. As the tea ball and rod descend a short distance the lower end of the latch will strike the top of the knob and as the rod descends the latch will rest on the top of the knob as shown in Figs. 2 and 3, and hold the tea ball in a suspended position above the liquid, as indicated by broken lines in Fig. 1. If the infusion is not of the desired strength, the chain may be again lifted to pull the latch 12 into vertical alinement with the rod and then let the chain and attached parts fall again with the tea ball submerged in the liquid, as shown in Fig. 1. In the foregoing construction the cover, knob and the tube by which it is fastened, when taken together constitute a vertically perforated cover.

We claim as our invention:—

1. In a tea or coffee pot, a vertically perforated cover, a tea ball having a rod extending upwardly therefrom, a latch pivoted by its middle to the upper end of the said rod and a chain attached by one end to one end of said latch, the other end of said latch being free to project laterally beyond the said rod and serve as a tripping end, the said latch being of a width to pass through the perforated cover when brought to a vertical position by a vertical pull on the free end of the chain and of a length such that it will not pass therethrough when turned to a horizontal position, and adapted to be turned into such horizontal position for supporting the tea ball by the engagement of the tripping end of the said latch on the top of the perforated cover, after the release of the said free end of the chain.

2. In a tea or coffee pot, a cover having a vertically perforated knob centrally mounted therein, a tea ball having a rod extending upwardly therefrom, a latch pivoted in the upper end of the said rod having the lower end free and a chain attached by one end to the upper end of the said latch and adapted to permit and prevent the downward passage of the said rod through the said knob according to the position of the said latch.

CHARLES F. SMITH.
GEORGE E. CURTISS.

Witnesses:
C. S. WILLIAMS,
W. A. LEWIS.